July 17, 1923.　　　　　　　　　　　　　　　　　　　1,462,387
B. E. SLADE
STRAW SPREADER FOR HARVESTING AND THRASHING MACHINES
Filed June 26, 1922　　　3 Sheets-Sheet 3
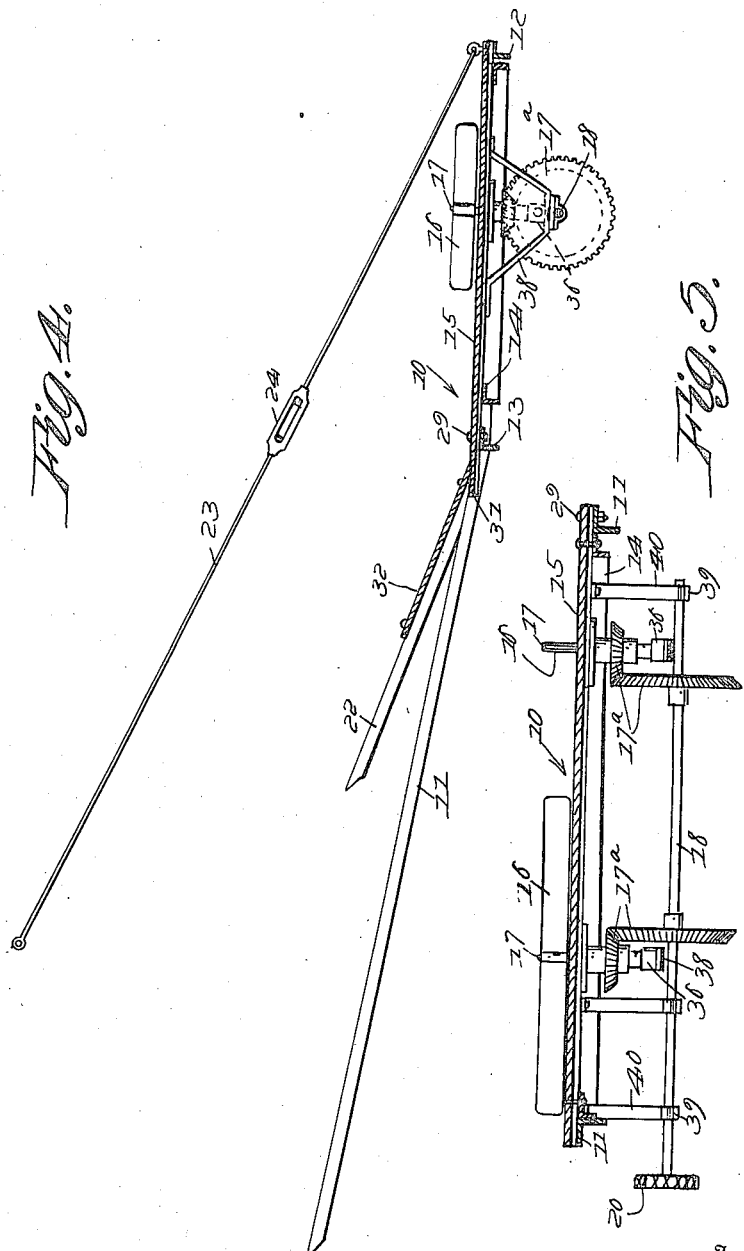

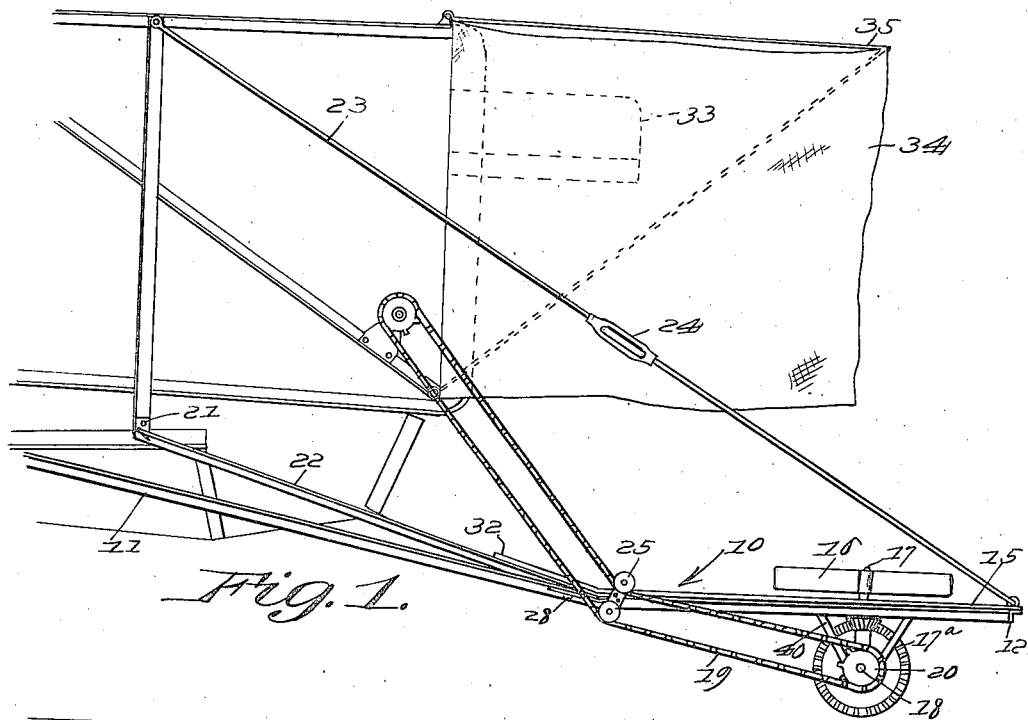
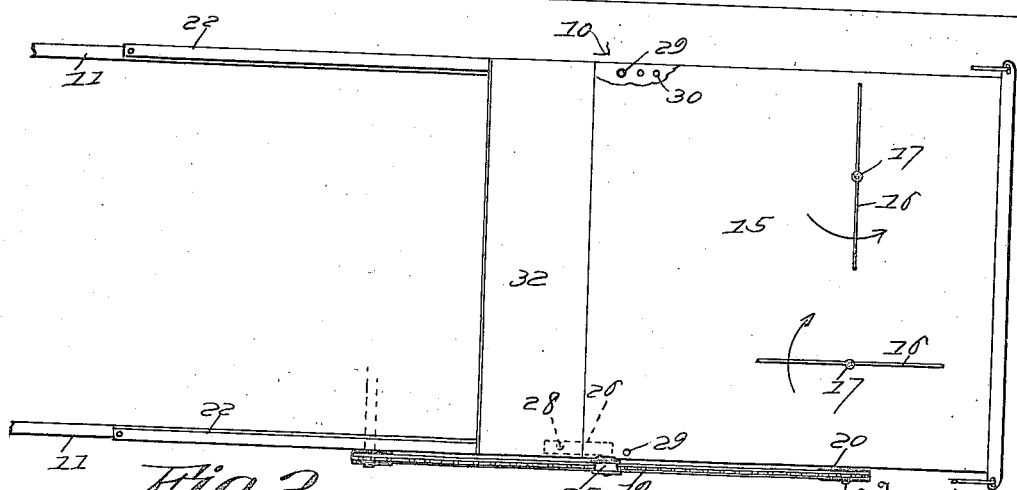

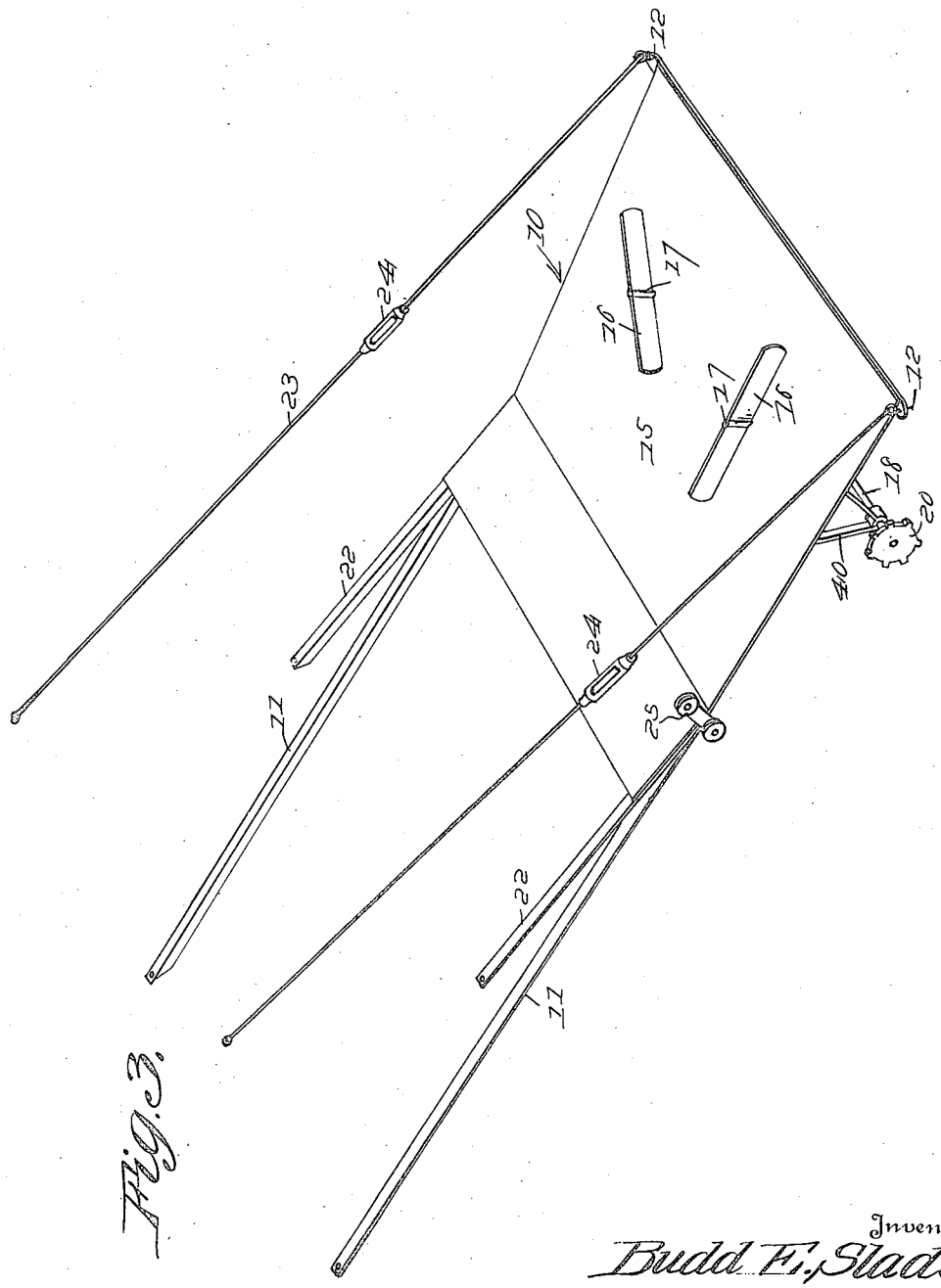

Patented July 17, 1923.

1,462,387

UNITED STATES PATENT OFFICE.

BUDD E. SLADE, OF COZAD, NEBRASKA.

STRAW SPREADER FOR HARVESTING AND THRASHING MACHINES.

Application filed June 26, 1922. Serial No. 570,809.

*To all whom it may concern:*

Be it known that BUDD E. SLADE, a citizen of the United States of America, residing at Cozad, in the county of Dawson and State of Nebraska, has invented new and useful Improvements in Straw Spreaders for Harvesting and Thrashing Machines, of which the following is a specification.

The object of the invention is to provide a simple and efficient construction of straw spreader adapted to be employed as an attachment to harvesting and thrashing machines in the field as a means of disposing of the straw or residue of the thrashing operation without involving the inconveniences of the present methods which contemplate the discharge of the straw from a spout or other conveyor in rear of the machine on a line or path of comparatively narrow width, and with reference to which there are numerous disadvantages. Among such disadvantages may be mentioned the fact that there is a certain amount of the grain or seed which is not separated from the straw or which passes through the separating mechanism which is discharged with the straw and which constitutes a volunteer growth in the field so that when the field is again sowed and the grain in the operation of sowing is evenly distributed over the surface of the field it supplements the grain which has been planted by the discharge of the straw and constitutes an unusually heavy growth where the straw has been discharged. This heavy stand or grain is difficult to harvest and constitutes a serious objection to the method ordinarily practiced of discharging the threshed straw from the harvester. Moreover in harrowing the field preparatory to seeding it frequently occurs that the disks are unable to penetrate the mat of straw which has been discharged in the operation of the harvester and thresher and therefore that the soil is not properly prepared for the new planting.

An important object of the present invention, therefore, is to avoid the deposit of the threshed straw in a line, path or wind row, and serving as a means of creating an unusually heavy or uneven growth or stand of the grain and an obstruction to the action of a harrow or other cultivating implement for preparing the soil for seeding, but rather to effect a substantially uniform or even distribution of the straw and hence of the grain which passes through the thresher, so that the volunteer grain is scattered and does not constitute a heavy growth or stand, and so that the scattered grain offers no obstacle to the operation of the harrow, and furthermore so that the straw serves to uniformly fertilize the soil throughout the surface of the field and moreover serves more or less uniformly to conserve the moisture throughout the surface instead of in restricted patches or lines as heretofore.

With these and related objects in view the invention consists in a construction and combination of parts of which a preferred embodiment is shown in the accompanying drawings, wherein:—

Figure 1 is a side view of a straw spreading apparatus embodying the invention applied in the operative position to a harvester and thresher of conventional type.

Figure 2 is a plan view of the same.

Figure 3 is a perspective view of the attachment removed from the machine.

Figure 4 is a detail sectional view taken longitudinally of the same.

Figure 5 is a transverse view taken over the platform thereof in the plane of the drive shaft.

The apparatus consists essentially of a main frame attachable directly to the harvester and thresher indicated at 10 and comprising the side bars 11, terminal cross bar 12 and intermediate transverse brace 13 and an auxiliary, adjustable or sub-frame 14 mounted for longitudinal sliding movement on the main frame between the side bars thereof and having a platform 15 upon the surface of which operate the opposed rotary spreader fans 16 which are provided with spindles 17 actuable through gears 17ª by a drive shaft 18 disposed transversely of the frame and adapted to receive motion through a sprocket chain 19 driven by the thresher and traversing a sprocket wheel 20 on said shaft.

The side bars 11 of the main frame are adapted to be substantially secured to the frame of the harvester and in turn braces 22 bolted as at 21 cooperate therewith to insure the stability and rigidity of the frame while auxiliary tensile braces 23 extend obliquely forward and upward to convenient portions of the thrashing machine to effectually support the weight of the apparatus, said tensile braces being provided with adjusting means such as turn buckles 24 or the equivalents thereof. A chain tightener 25 is mounted upon the main frame to take up any slack in the drive chain and is carried by bracket 26 secured by set screws 28. The sub-frame is secured in its adjusted positions by bolts 29 for the reception of which the side bars of the main frame are provided with series of openings 30 for selective use.

The platform of the sub-frame is extended forwardly beyond the main frame as shown at 31 to allow for the longitudinal adjustment of the latter and in the retracted or collapsed position extends under an apron 32 arranged in the inclined position upon the main frame and supported by the braces 22. In the adjustment of the sub-frame the extension of the platform thereof cooperates with the rear edge of the apron to maintain a continuous surface to guide the straw in its passage to the distributing fans which operate as indicated by the arrows in Figure 2 in such a direction as to scatter the straw rearwardly and laterally over a relatively wide area as the machine progresses.

It will be noted that the working parts of the apparatus so far as the straw distributing or scattering feature is concerned are carried by the sub-frame so as to be adjustable therewith and hence with relation not only to the main frame of the attachment but also with relation to the thresher, the extent of adjustment in a practical embodiment of the machine being about ten inches forwardly and rearwardly, and if the sub-frame is adjusted to the limit of its forward movement the tendency is to throw the straw more directly backward or rearwardly of the machine whereas if the sub-frame is extended to the limit of its movement the spreader distributes the straw more to the sides of the path of the harvester and less to the rear. In this way it is possible for the operator to vary the degree of spreading or distributing action to effect the desired object and prevent the objectionable cencentration of the discharge of straw and loose grain in a straight path directly following the harvester as hereinabove explained and consequently without the resultant disadvantages to subsequent crops or the working of the soil in preparation for seeding.

It will further be noted that whereas the apparatus as herein shown is particularly designed and adapted for use in connection with harvesters of the Deering type, its means of application to the machine are such as to readily permit of modification to adapt it to be applied to harvesters of other types without in any way detracting from its efficiency or utility, particularly in view of the provision of means whereby the straw distributing elements may be adjusted longitudinally of the path of progress of the machine and relatively to the straw outlet of the machine to modify the scope of the area upon which the grain is deposited, without changing the means of attachment of the device of the machine.

In the construction illustrated the straw discharge outlet 33 is arranged within a wind shield 34 which overhangs the platform of the spreader and is supported by a suitable skeleton frame 35, said wind shield serving to prevent the lighter portions of the discharge from the outlet from being diverted in their movement toward the platform of the spreader by side currents of air.

Furthermore as a means of minimizing the resistance to the operation of the spreader blades or hands the spindle 17 of each fan is provided with a thrust bearing 36 supported by a hanger 38 depending from the platform of the sub-frame. The bearings 39 in which the drive shaft 18 is mounted are supported by hanger brackets 40 also depending from the sub-frame so that the operating parts of the spreader mechanism are all movable with the sub-frame in its adjustment forwardly and rearwardly.

Having described the invention, what is claimed as new and useful is:—

1. A straw spreader having a main frame provided with means for attachment to a harvester, a sub-frame mounted upon the main frame for adjustment longitudinally of the path of progress of the harvester and carrying a distributing platform for receiving the discharge from the thresher mechanism, opposed rotary fans mounted to traverse the surface of the platform, and means actuable by the harvester for communicating rotary motion to the fans.

2. A straw spreader having a main frame provided with means for attachment to a harvester, a sub-frame mounted upon the main frame for adjustment longitudinally of the path of progress of the harvester and carrying a distributing platform for receiving the discharge from the thresher mechanism, opposed rotary fans mounted to traverse the surface of the platform, means actuable by the harvester for communicating rotary motion to the fans, and a guide apron carried by the main frame in a plane oblique to the platform of which the forward end is disposed to overlap the adjacent edge of the apron in all positions of adjustment of the platform.

In testimony whereof he affixes his signature.

BUDD E. SLADE.